UNITED STATES PATENT OFFICE.

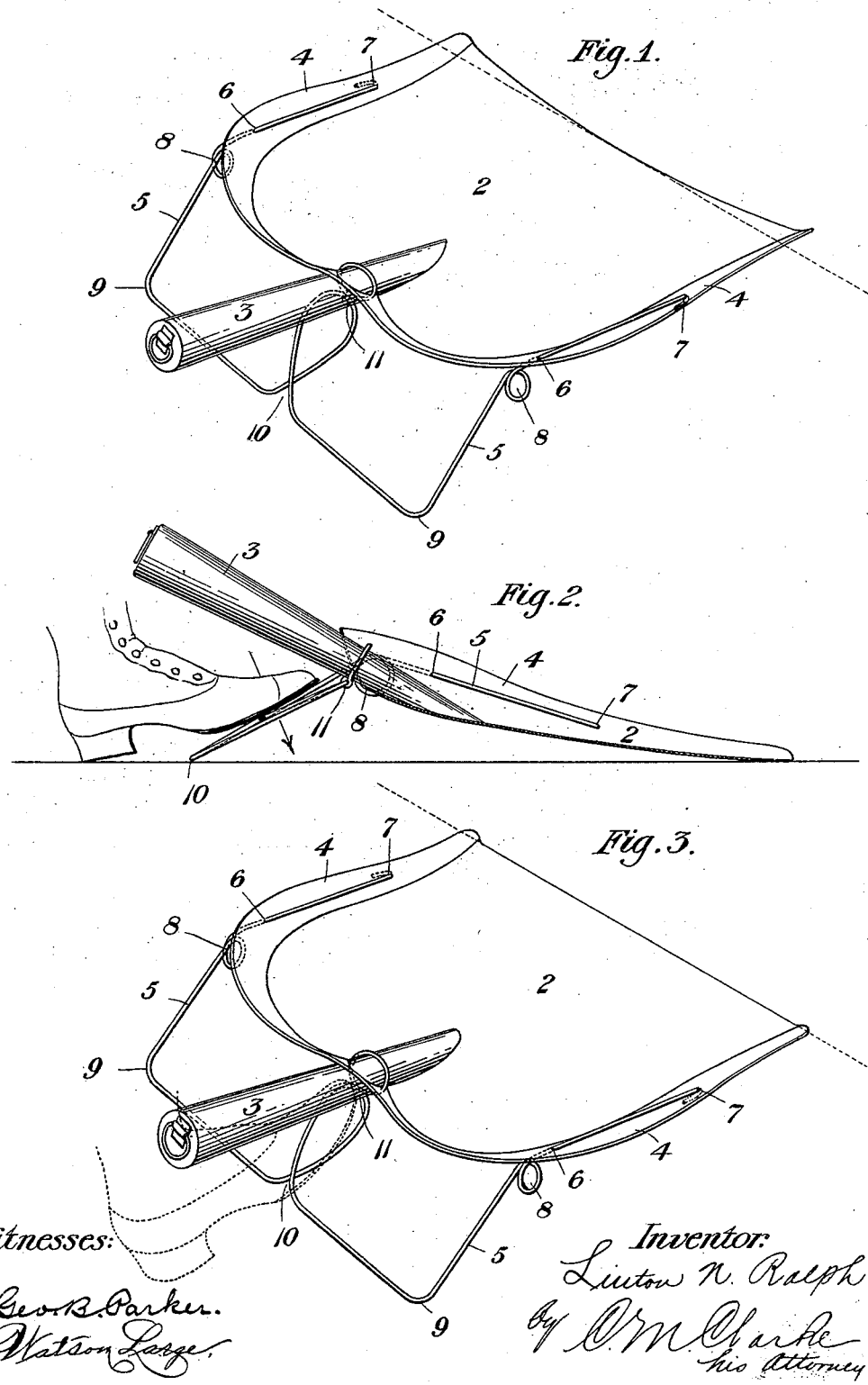

LINTON N. RALPH, OF PITTSBURG, PENNSYLVANIA.

DUST-PAN.

SPECIFICATION forming part of Letters Patent No. 594,756, dated November 30, 1897.

Application filed March 19, 1897. Serial No. 628,285. (No model.)

*To all whom it may concern:*

Be it known that I, LINTON N. RALPH, a citizen of the United States, residing at Pittsburg, in the county of Allegheny and State of Pennsylvania, have invented or discovered a new and useful Improvement in Dust-Pans, of which the following is a full, clear, and exact description, reference being had to the accompanying drawings, forming part of this application, in which—

Figure 1 is a perspective view of a dust-pan provided with my improved device. Fig. 2 is a central longitudinal section showing the pan in action. Fig. 3 is a view similar to Fig. 1, showing the depressing device in action and the front edge held down to the floor.

My invention relates to improvements in dust-pans; and it consists of a treadle wire attachment by which the front edge of the pan may be held firmly down upon the floor for the full length of the edge without use of the hand or stooping down, thereby permitting the operator to sweep into the pan with much greater ease and facility than when one hand is engaged in holding the pan.

Referring to the drawings, 2 is the pan, provided with the usual handle 3 and upturned sides 4, the front edge being straight. After use ordinarily in a short time the edge becomes more or less curved, as shown in Fig. 1, and the difficulty of holding the pan close down to the floor, so as to insure the sweepings being carried into the pan by the broom, is greatly increased. For the purpose of providing means to depress the front edge I employ a stiff wire 5, secured to the sides of the pan by inserting through the side at 6, extending forwardly a short distance on the inner side and passing out through the side at 7 and turned under. Any other convenient way of securing the wire may be employed, as by soldering or using clips, &c.

Immediately back of the point where the wire first enters the pan at 6 it is preferably coiled, as at 8, thereby providing a spring, and the wire is extended downwardly and back to a point 9, where it is bent inwardly toward the center, meeting at 10, when it is again bent up and formed into a loop, the upper end of which is loosely but securely held by a wire or other suitable attaching device at 11, so as to permit the wire to have the necessary movement.

When laid on the floor, as in Fig. 1, the pan will rest on its forward edge and the back cross members of the wire, but when the foot of the operator is placed on the center loop the downward pressure will be transmitted through the wire to the sides and front edge, the springs 8 assisting in the operation, and the front edge will be straightened out and flattened against the floor, as clearly shown in Fig. 3, when the pan may be used in the desired manner.

My device is very simple and cheap to construct and may be readily and quickly applied to the pan, while the benefits of its operation will be appreciated by the user of such utensils.

Having described my invention, what I claim, and desire to secure by Letters Patent, is—

1. An edge-depressing device for dust-pans consisting of a double-sided arched treadle secured at the forward ends to the sides of the pan having a back portion formed at right angles to the arched side members and a central loop member extending up to and secured to the handle of the pan at its base, substantially as set forth.

2. An edge-depressing device for dust-pans consisting of double-sided arched wire treadle with a spiral formed in the wire at the apex of the arch, secured at the forward ends to the sides of the pan, having a back portion formed at right angles to the arched side members and a central loop member extending up to and secured to the handle of the pan at its base, substantially as set forth.

3. In combination with a dust-pan; a front-edge-depressing device consisting of a wire treadle attachment formed with a central loop secured at its front to the base of the handle of the pan, extending backwardly at an angle to the floor, opposite lateral extensions of the loop conforming to the floor-level, and forwardly upwardly extending side members, deflected to aline with the sides of the pan and secured thereto, substantially as set forth.

4. In combination with a dust-pan; a front-edge-depressing device consisting of a wire treadle attachment formed with a central loop secured at its front to the base of the handle of the pan, extending backwardly at an angle to the floor, opposite lateral extensions of the loop conforming to the floor-level, and forwardly upwardly extending side members formed into a loop and deflected to aline with the sides of the pan and secured thereto, substantially as set forth.

5. In combination with a dust-pan; an edge-depressing device consisting of a double-sided arched wire treadle with a spiral formed in the wire at the apex of the arch, secured at the forward ends to the sides of the pan having a back portion formed at right angles to the arched side members and a central loop member extending up to and secured to the pan at its base, substantially as set forth.

In testimony whereof I have hereunto set my hand this 18th day of January, 1897.

LINTON N. RALPH.

Witnesses:
C. M. CLARKE,
GEO. B. PARKER.